United States Patent [19]

Imamura

[11] Patent Number: 5,381,243
[45] Date of Patent: Jan. 10, 1995

[54] ARRANGEMENT AND METHOD FOR ATTACHING IMAGE SENSOR TO ELECTRONIC MACHINE

[75] Inventor: Masaya Imamura, Kyoto, Japan

[73] Assignee: Rohm Co., Ltd., Kyoto, Japan

[21] Appl. No.: 995,191

[22] Filed: Dec. 22, 1992

[30] Foreign Application Priority Data

Jan. 7, 1992 [JP] Japan .................................. 4-000426

[51] Int. Cl.⁶ ........................................... H04N 1/028
[52] U.S. Cl. .................................... 358/471; 358/496;
   248/221.1; 248/231.8; 248/316.7; 24/3 J; 24/3 L; 24/458
[58] Field of Search ............... 358/471, 497, 494, 482, 358/483; 248/74.2, 221.1, 231.8, 316.7; 257/727; 24/3 L, 3 J, 458, 530, 570

[56] References Cited

U.S. PATENT DOCUMENTS

| 2,924,809 | 2/1960 | Wilson | 248/316.7 |
| 3,029,057 | 4/1962 | Ferm | 248/316.7 |
| 3,182,807 | 5/1965 | Root | 248/316.7 |
| 4,124,267 | 11/1978 | Mines et al. | 248/27.3 |

*Primary Examiner*—Scott A. Rogers
*Attorney, Agent, or Firm*—Wolf, Greenfield & Sacks

[57] ABSTRACT

A method of attaching an image sensor having a frame at the mounting position of an electronic machine. Protruding portions are formed on both side surfaces of the frame, and a fitting guide is provided at the mounting position of the electronic machine. One end of the fitting guide is a rectilinearly bent engaging portion and the other end is an arc-shaped engaging portion. When the image sensor is pushed to the mounting portion, the protruding portions engage the respective engaging portions, whereby the image sensor is fixed.

14 Claims, 6 Drawing Sheets

ARRANGEMENT AND METHOD FOR ATTACHING IMAGE SENSOR TO ELECTRONIC MACHINE

BACKGROUND OF THE INVENTION

1. Field of the Invention

The present invention relates to an image sensor incorporated into an electronic machine such as a facsimile machine, a copying machine or an optical character reader.

2. Description of the Related Art

A conventional image sensor is generally composed of a transparent cover attached to the upper portion of a frame so as to bring the surface of the cover into contact with the object of imaging, the frame encasing a light-emitting portion for projecting light onto the object, an optical system for converging the light reflected from the object and a light-receiving portion for receiving the light from the optical system. The light-emitting portion and the light-receiving portions are provided on the respective substrates, and these substrates are fixed to the frame.

Methods of attaching such an image sensor to an electronic machine such as a facsimile machine or a copying machine are roughly classified into the two methods shown in FIGS. 5 and 6. In the method shown in FIG. 5, threaded holes 41a, 41b are formed in both longitudinal side surfaces of a frame 41 of an image sensor 40 having a transparent cover (glass cover) 42, and two L-shaped plate members 50, 51 are provided at the mounting portion of the electronic machine to which the image sensor 40 is attached. Holes 50a, 51a, and 50b, 51b which correspond to the threaded holes 41a and 41b, respectively, are formed in the plate members 50 and 51, respectively. Screws 52, 54 and 53, 55 are passed through the holes 50a, 50b, and 51a, 51b so as to be engaged with the threaded Roles 41a and 41b, respectively. Both end surfaces of the image sensor 40 are thus sandwiched between the plate members 50 and 51, and in this state the image sensor 40 is fixed to the electronic machine.

In the method shown in FIG. 6, two threaded holes 61a, 61b are formed in both side surfaces of a frame 61 of an image sensor having a glass cover 62, and two L-shaped plate members 70, 71 are provided at the mounting portion of the electronic machine to which the image sensor 60 is attached. Holes 70a, 71a, and 70b, 71b which correspond to the threaded holes 61a and 61b, respectively, are formed in the plate members 70 and 71, respectively. Screws 72, 74, 73 and 75 (not shown) are passed through the holes 70a, 71a, and 70b, 71b so as to be engaged with the threaded holes 61a and 61b, respectively. Both side surfaces of the image sensor 60 are thus sandwiched between the plate members 70 and 71, and in this state the image sensor 60 is fixed to the electronic machine.

In both of the methods shown in FIG. 5 and 6, it is necessary to form the threaded holes in the frame of the image sensor. This machining cost is very high. In addition, since it is necessary to pass the screws first into the plate members and thereafter engage them with the threaded holes of the frame when the image sensor is attached to the electronic machine, attachment of the image sensor to the electronic machine is time and labor intensive.

SUMMARY OF THE INVENTION

Accordingly, it is an object of the present invention to eliminate the above-described problems in the related art and to provide an arrangement and a method for attaching an image sensor to an electronic machine with ease and at a low cost.

To achieve this aim, in the present invention, an image sensor is provided with a frame having an interlocking portion which fits into the mounting portion of an electronic machine to which the image sensor is attached.

According to this structure, the interlocking portion of the frame is fitted into the mounting portion of the electronic machine simply by pushing the image sensor into the mounting portion of the electronic machine, so that the image sensor is easily fixed to the electronic machine. Since the frame is generally produced by extrusion molding, even if the frame has a slightly complicated shape, the cost is not raised and is rather reduced by the equivalent of the cost of threading which is required in a conventional frame.

The above and other objects, features and advantages of the present invention will become clear from the following description of preferred embodiments thereof, taken in conjunction with the accompanying drawings.

DESCRIPTION OF THE PREFERRED EMBODIMENT

An image sensor in accordance with the present invention will now be explained with reference to the embodiments.

Figure 1:
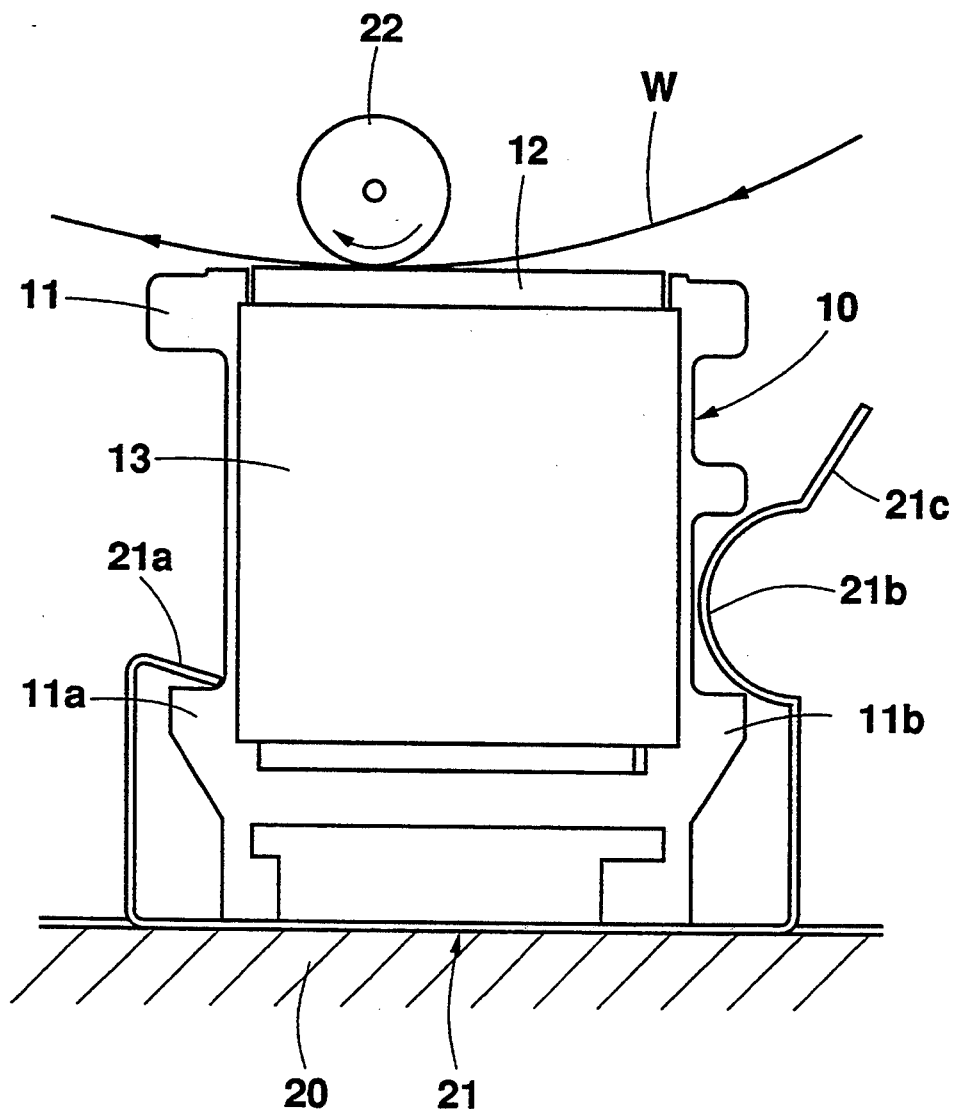
FIG. 1 is a side elevational view of an embodiment of an arrangement for attaching an image sensor to an electronic machine according to the present invention.

FIG. 1 shows an image sensor 10 in accordance with the present invention which is attached to the mounting portion 20 of an electronic machine such as a facsimile machine or a copying machine. The image sensor 10 is approximately the same as a conventional image sensor except for the external shape of a frame 11. A transparent cover (glass cover) 12 is attached to the upper portion of the frame 11, and a side plate 13 is provided on both end surfaces of the image sensor 10. The frame 11 encases a substrate provided with a light-emitting device (e.g., LED chip), a substrate provided with a light-receiving element ( e.g., photodiode chip), a rod lens array as an optical system for converging the light reflected from the copy W on the transparent cover 12, etc.

The light emitted from the light-emitting device illuminates the original W which is fed onto the glass cover 12 by a platen roller 22. The light reflected from the original W is converged by the rod lens array, and is received and converted into an electric signal by the light-receiving device.

On both longitudinal side surfaces of the frame 11, protruding portions 11a and 11b are formed in the longitudinal direction. Since the frame 11 is produced by extrusion molding, as described above, it is possible to produce the frame 11 having the protruding portions 11a, 11b easily and at a low cost.

The electronic machine is provided at the mounting portion 20 with a fitting guide 21 having the shape shown in FIG. 1. The fitting guide 21 has, at one end, an engaging portion 21a which is bent in a perpendicular fashion and, at the other end, an engaging portion 21b which is bent into an arc and an extending portion 21c which linearly extends from the engaging portion 21b. The fitting guide 21 may be produced either by sheet metal working or by extrusion of a resin, a metal, etc.

The protruding portions 11a and 11b of the frame 11 are engaged with the engaging portions 21a and 21b, respectively, of the fitting guide 21. It is therefore possible to incorporate the image sensor 10 into the electronic machine simply by pushing the image sensor 10 into the mounting portion 20. Since the protrusion 11a is engaged with the engaging portion 21a and the protruding portion 11b is engaged with the engaging portion 21b, the image sensor 10 is securely fixed to the mounting portion 20 due to the appropriate elasticity of the fitting guide 21.

Figure 3:
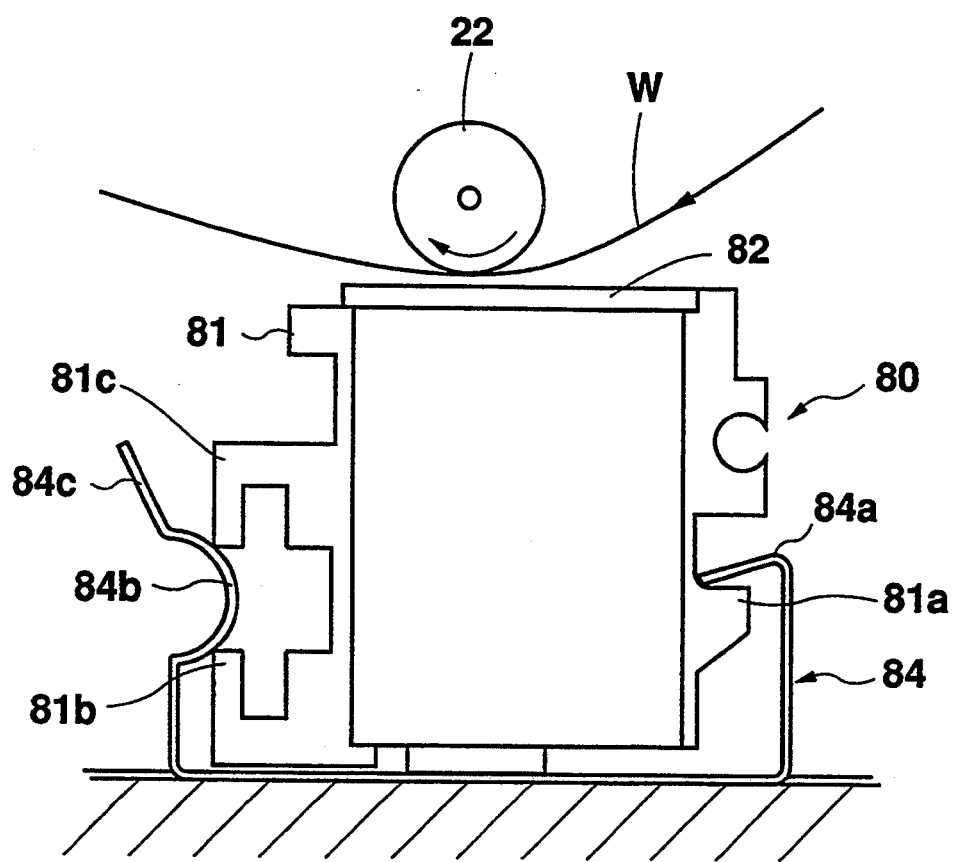
FIG. 3 is a side elevational view of still another embodiment of an arrangement for attaching an image sensor to an electronic machine according to the present invention.

In attaching the image sensor 10 to the electronic machine, instead of pushing the image sensor in a direction perpendicular to the mounting portion 20 from above, as described above, the protruding portion 11a may be first engaged with the engaging portion 21a by inclining the image sensor with the protruding portion 11a faced downward, and thereafter the image sensor 10 may be rotated clockwise in FIG. 3 so as to engage the protruding portion 11b with the engaging portion 21b.

Each of the protruding portions 11a and 11b has a tapered surface, and since the engaging portion 21a is inclined downward and the engaging portion 21b is arched, the protruding portions 11a, 11b are not caught by the engaging portions 21a and 21b, respectively. It is therefore easy to push the image sensor 10 into the mounting portion 20. In order to remove the image sensor 10, the engagement between the protruding portion 11b and the engaging portion 21b is released by pushing the extending portion 21c by a screw driver or the like. In this way, quick removal of the image sensor 10 is possible, for example, at the time of reworking the image sensor.

Although the image sensor 30 is slightly unstable due to a tolerance when the image sensor 30 is fitted into the mounting portion 20 by the engagement between the protruding portions 11a, 11b and the engaging portions 21a, 21b, since the image sensor 10 is pressed against the mounting portion 20 by the platen roller 22 during use, it produces no problem.

Figure 2:
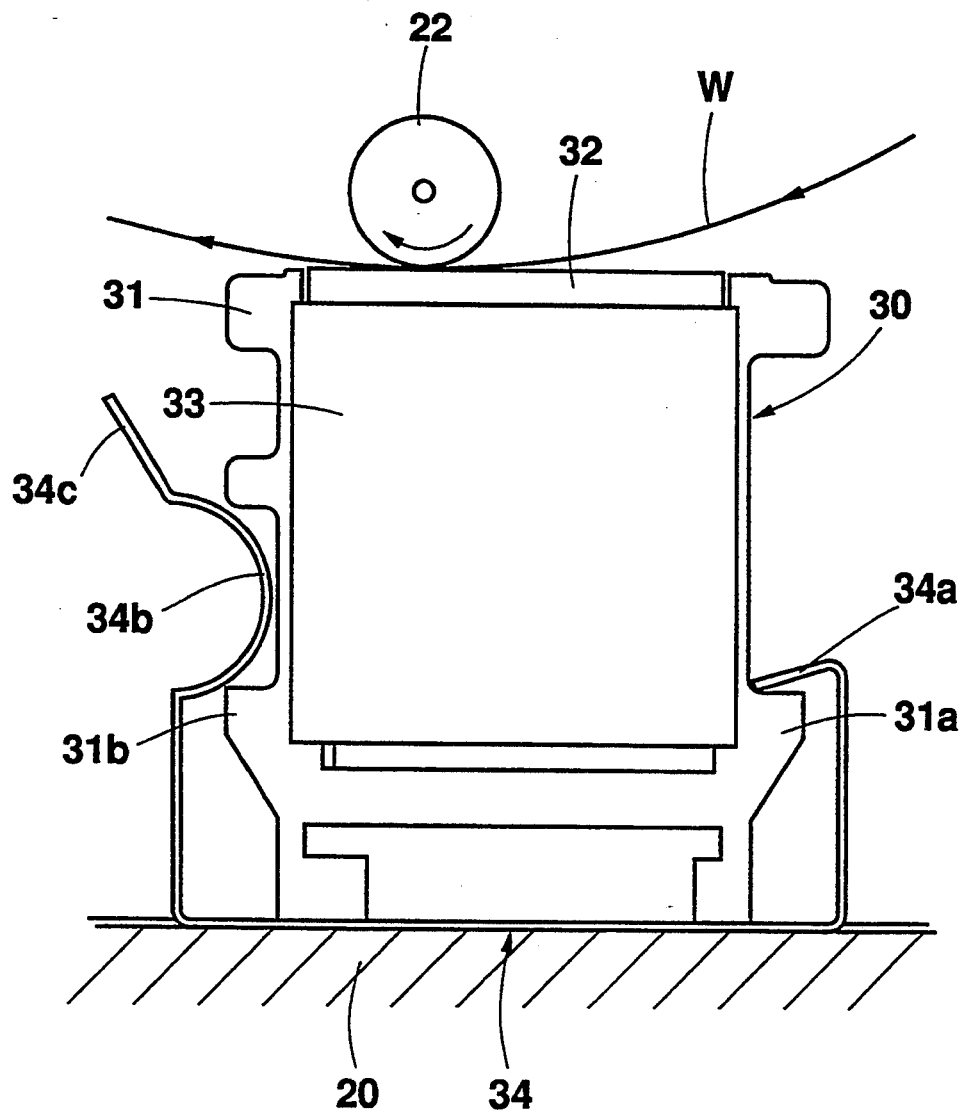
FIG. 2 is a side elevational view of another embodiment of an arrangement for attaching an image sensor to an electronic machine according to the present invention.

FIG. 2 shows a second embodiment. This embodiment has approximately the same structure as the first embodiment shown in FIG. 1 except that tile image sensor and the fitting guide are disposed in the opposite direction to the image sensor 10 and the fitting guide 21 with respect to the direction of feeding the original W. In other words, an image sensor 30 and a fitting guide 34 of this embodiment have the same structure as those in the first embodiment but the direction in which they are disposed is opposite.

A transparent cover (glass cover) 32 is attached to the upper portion of a frame 31, and a side plate 33 is provided on both end surfaces of the image sensor 30. On both longitudinal side surfaces of the frame 31, protruding portions 31a and 31b are formed in the longitudinal direction. Since the frame 31 is produced by extrusion molding, as in the first embodiment, it is possible to produce the frame 31 having the protruding portions 31a, 31b with easiness and at low cost.

The electronic machine is provided at the mounting portion 20 with the fitting guide 34 having the shape shown in FIG. 2. The fitting guide 34 has, at one end, an engaging portion 34a which is bent in a perpendicular fashion and, at the other end, an engaging portion 34b which is bent into an arc and an extending portion 34c which linearly extends from the engaging portion 34b.

The protruding portions 31a and 31b of the frame 31 are engaged with the engaging portions 34a and 34b, respectively, of the fitting guide 34. It is therefore possible to incorporate the image sensor 30 into the electronic machine simply by pushing the image sensor 30 into the mounting portion 20. Since the protrusion 31a is engaged with the engaging portion 34a and the protruding portion 31b is engaged with the engaging portion 34b, the image sensor 30 is securely fixed to the mounting portion 20 due to the appropriate elasticity of the fitting guide 34.

Since each of the protruding portions 31a and 31b has a tapered surface, as in the first embodiment, it is easy to push and fix the image sensor 30 to the mounting portion 20.

In this embodiment, the moment produced when the original W is fed, namely, the moment in the counterclockwise direction applied to the frame 31 is suppressed by the protruding portion 34a, thereby securing the image sensor 30 to the mounting portion 20 of the electronic machine. If the protruding portion 34a is so designed as to urge the frame 31 downward, the securing effect is further enhanced.

FIG. 3 shows a third embodiment. In this embodiment, the frame has a slightly different shape from those of the first and the second embodiments. The frame of this embodiment is provided with a lower protruding portion 81b which corresponds to the protruding portions 11b, 31b in the first and the second embodiments, and is further provided with an upper protruding portion 81c. A fitting guide 84 has approximately the same shape as the fitting guide 34 of the second embodiment, and an engaging portion 84a is engaged with a protruding portion 81a. An engaging portion 84b is engaged with the upper and the lower protruding portions 81b and 84c, thereby fixing the frame 81. An extending portion 84c corresponding to the extending portion 34c in the second embodiment is formed on the fitting guide 84.

Although the lower protruding portion 81b has no tapered surface, it is possible to attach the frame 81 to the mounting portion of the electronic machine by engaging first the protruding portion 81a with the engaging portion 84a, and thereafter engaging the protruding portions 81b and 81c with the engaging portion 84b while rotating the frame 81.

Figure 4:
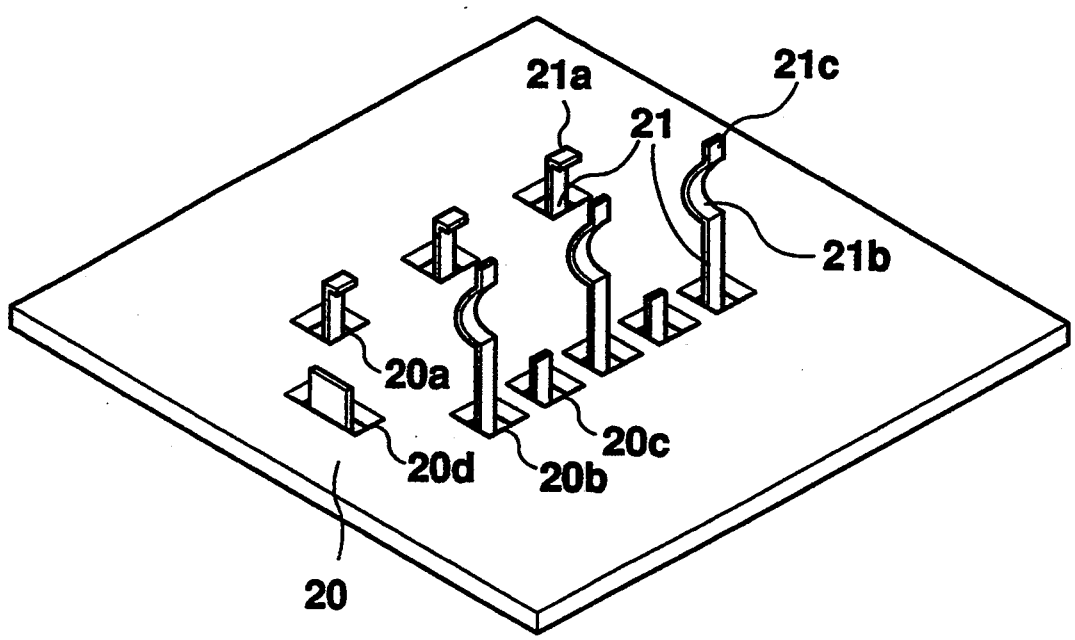
FIG. 4 shows the arrangement of the fitting guide in each of the embodiments shown in FIGS. 1, 2 and 3.
Figure 5:
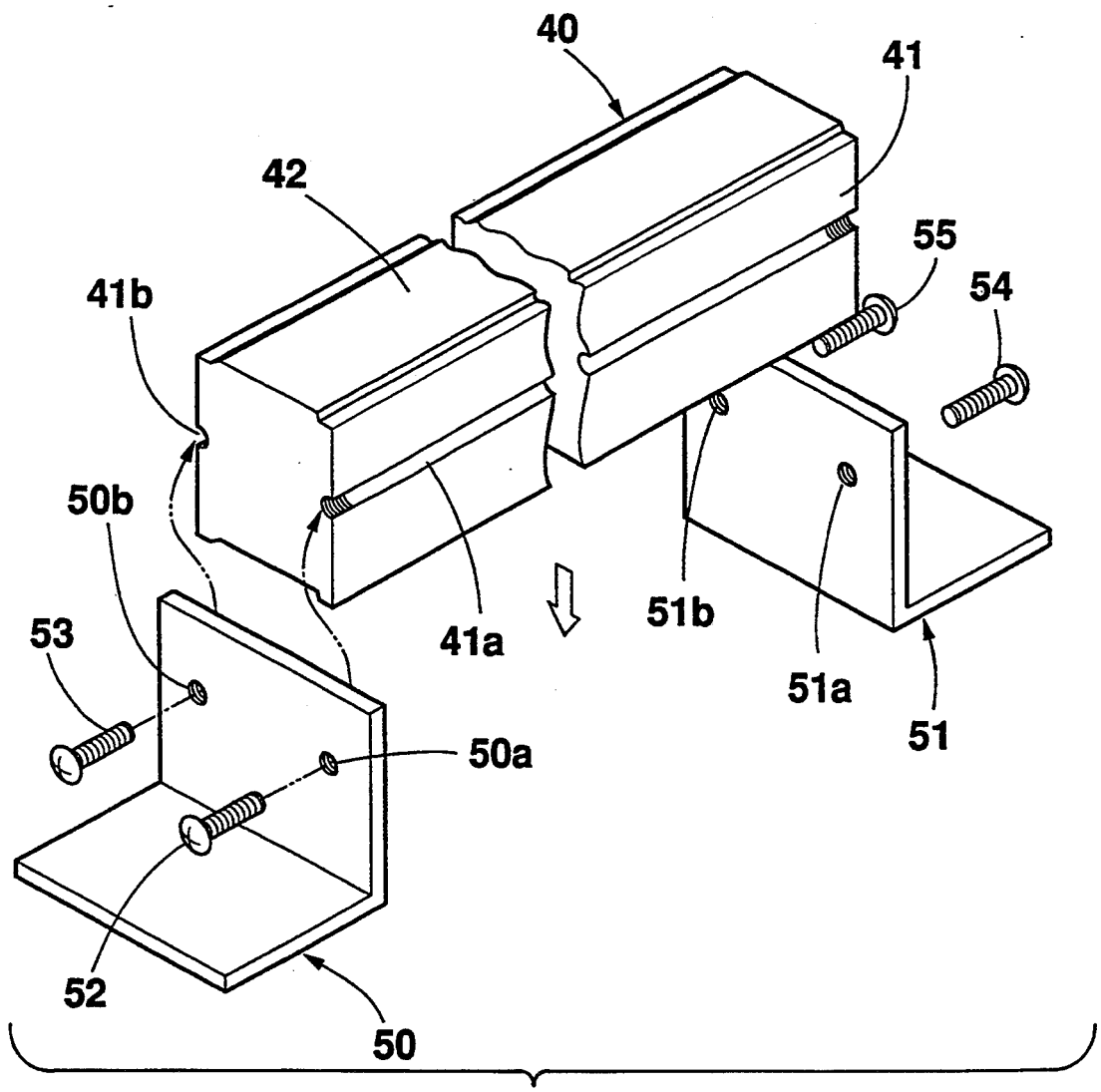
FIG. 5 is a partially omitted perspective view of a conventional method of incorporating an image sensor into an electronic machine.
Figure 6:
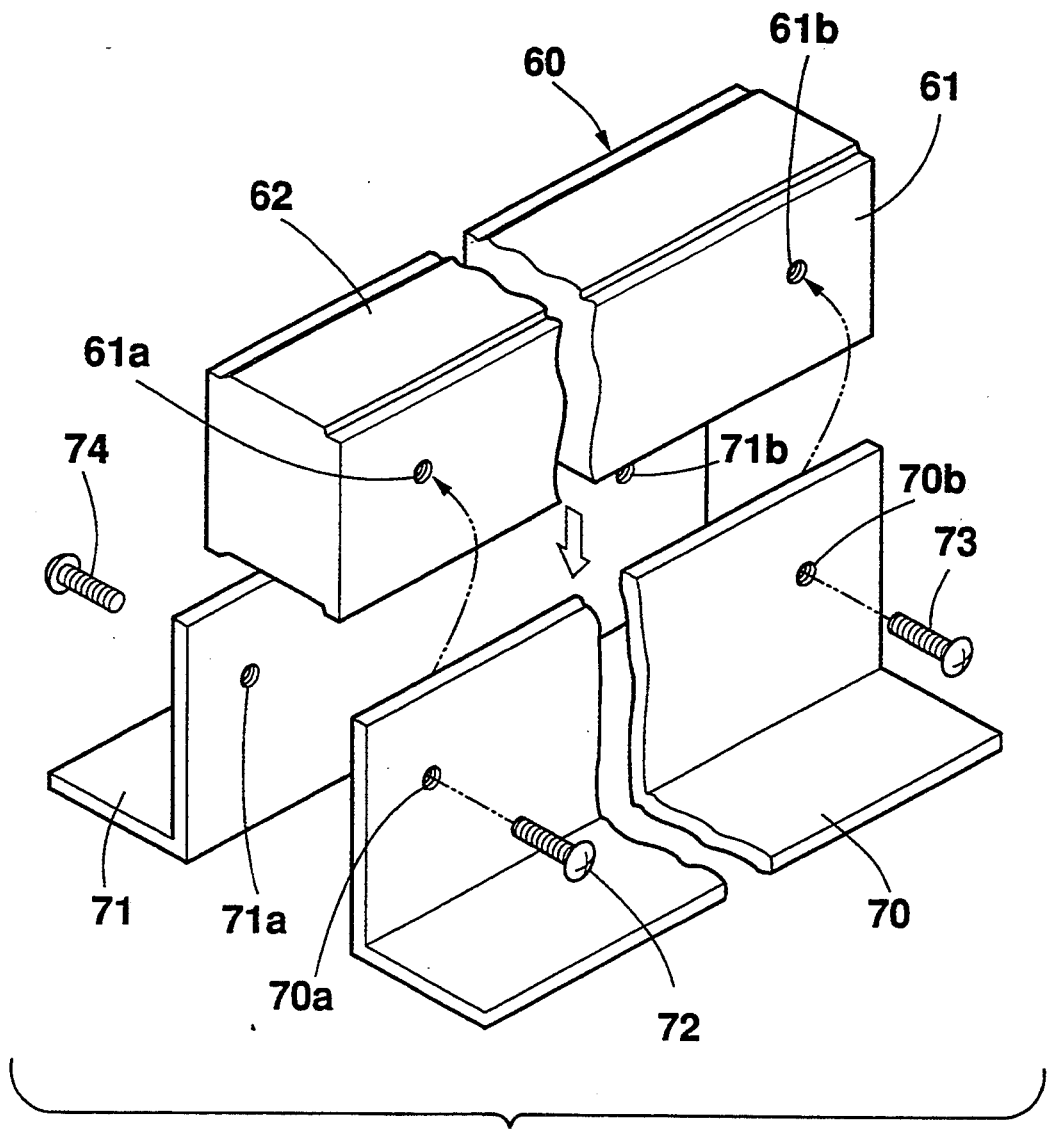
FIG. 6 is a partially omitted perspective view of another conventional method of incorporating an image sensor into an electronic machine.

FIG. 4 shows the arrangement of the fitting guide on the mounting portion of the electronic machine. In FIG. 4, the reference numerals correspond to the elements in the first embodiment shown in FIG. 1, but this arrangement is applicable to the guides in the other embodiments. The fitting guide 21 is disposed on the back surface of the mounting portion 20 of the electronic machine such that the engaging portions 21a and 21b protrude from the upper surface of the mounting portion 20. Through holes 20a, 20b, 20c and 20d having the sizes and the shapes corresponding to the respective engaging portions or positioning protrusions are formed in the mounting portion 20. The fitting guide 21 is fixed on the back surface of the mounting portion 20. Through the fitting guide 21 fixed in this manner, the image sensor 10 is attached to the electronic machine in the above-described manner.

In none of the above-described embodiments, is it necessary to fix the frame by screws. As a result, it is possible to use not only a metal material such as aluminum but also a resin material such as polycarbonate as a frame material. That is, it is possible to constitute the image sensor even by a soft material which would not allow screwing.

As described above, the image sensor in accordance with the present invention is provided with a frame having an interlocking portion which fits into the mounting portion of an electronic machine. This structure produces the following advantages:

(1) Simply by pushing the image sensor into the mounting portion of the electronic machine, the interlocking portion of the frame fits into the mounting portion, thereby fixing the image sensor to the electronic machine. It is therefore possible to greatly reduce the time taken to attach the image sensor to the electronic machine.

(2) Since the frame is generally produced by extrusion molding, the cost of the frame having the interlocking portion is not raised and is rather reduced by the equivalent of the cost of threading which is required in a conventional frame.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An arrangement for attaching an image sensor to an electronic machine comprising:
   a frame incorporated into said image sensor and having a bottom surface which is in contact with the mounting portion of said electronic machine to which said image sensor is attached, and two longitudinal side surfaces which are approximately orthogonal to said bottom surface and respectively provided with protruding portions;
   at least one fitting guide arranged on said mounting portion of said electronic machine and having two engaging portions which engage the respective protruding portions so that said image sensor is attached to said mounting portion of said electronic machine, wherein at least one of said protruding portions has an inclined surface which faces said bottom surface of said frame, and one of said engaging portions of said fitting guide is bent rectilinearly at not less than 90 degrees and the other is bent into an arc.

2. An arrangement for attaching an image sensor to an electronic machine according to claim 1, wherein said image sensor is used for a copy reading machine, and the engaging portion having a rectilinearly bent shape is disposed in the upstream direction of copy feeding.

3. An arrangement for attaching an image sensor to an electronic machine according to claim 2, wherein the engaging portion having an arc shape is further linearly extended to have an extending portion.

4. An arrangement for attaching an image sensor to an electronic machine according to claim 2, wherein an urging force approximately directed toward said bottom surface of said frame is applied to the protruding portion which is engaged with said engaging portion having a rectilinearly bent shape when said image sensor is attached to said electronic machine.

5. An arrangement for attaching an image sensor to an electronic machine according to any of claims 1 to 4, wherein said fitting guide is U-shaped, said mounting portion is composed of a plate member having through holes through which said engaging portions of said fitting guide respectively pass, and said fitting guide and said frame clamp said mounting portion therebetween so that said image sensor is fixed.

6. An assembly for attachment to an electronic machine having a mounting portion, the assembly comprising:
   an image sensor including a frame having a bottom portion which is in contact with the mounting portion, and first and second longitudinal side portions which extend from the bottom portion and are disposed substantially orthogonal to the mounting portion, the first side portion having a first protruding portion; and
   a fitting guide coupled to the mounting portion and having a first engaging member which has an end and an arcuate portion intermediate the mounting portion and the end, the arcuate portion of the engaging member engaging the first protruding portion to apply a force at least partially in a direction toward the mounting portion to attach the image sensor to the mounting portion of the electronic machine.

7. The assembly of claim 6 wherein the first side portion further comprises a second protruding portion, the first protruding portion, the second protruding portion, and the side portion defining a cavity, wherein the arcuate portion extends into the cavity while the end of the engaging member is outside the cavity.

8. The assembly of claim 7 wherein the arcuate portion contacts the first and second protruding portions at the same time.

9. The assembly of claim 6 wherein the second side portion has a second protruding portion, the fitting guide having a second engaging member having an end for engaging the second engaging member and for providing a force at one position which is in a direction which is at an incline relative to the mounting portion.

10. The assembly of claim 6 wherein the protruding portion has a proximal surface and a distal surface relative to the mounting portion, wherein the proximal surface is at an incline relative to the mounting portion, and wherein the engaging portion contacts the distal surface.

11. An apparatus comprising:
   an electronic machine having a mounting portion which includes a plate member having holes;

an image sensor including a frame having a bottom portion which is in contact with the mounting portion; and a U-shaped fitting guide coupled to the mounting portion and having engaging members and a middle portion intermediate the engaging members, the engaging members each passing through the holes in the plate member, wherein the fitting guide and the frame clamp the mounting portion so that the image sensor is rigidly fixed to the electronic machine.

12. The apparatus of claim 11 wherein the frame has two opposing sides, wherein the engaging members each engage one side, each engaging member providing to a side a force which is directed at an incline relative to the mounting portion.

13. The apparatus of claim 12 wherein each side has at least one protruding portion, wherein the engaging members each contact a protruding portion.

14. The apparatus of claim 13 wherein at least one of the engaging members has an arcuate portion intermediate the middle portion and an end of the engaging member, wherein the arcuate portion engages a protruding portion.

* * * * *